United States Patent [19]

Schwarzenbacher

[11] Patent Number: 5,397,142
[45] Date of Patent: Mar. 14, 1995

[54] BICYCLE, IN PARTICULAR AN ALL-TERRAIN BICYCLE

[76] Inventor: Rudolf Schwarzenbacher, Kleinarl 98, A-5602 Kleinarl, Austria

[21] Appl. No.: 81,389
[22] PCT Filed: Dec. 31, 1991
[86] PCT No.: PCT/AT91/00142
   § 371 Date: Jun. 29, 1993
   § 102(e) Date: Jun. 29, 1993
[87] PCT Pub. No.: WO92/12043
   PCT Pub. Date: Jul. 23, 1992

[30] Foreign Application Priority Data
   Jan. 2, 1991 [AT] Austria ........................ 3/91

[51] Int. Cl.$^6$ ............................................. B62M 1/02
[52] U.S. Cl. ................................. 280/260; 280/259; 280/304.3
[58] Field of Search ............... 280/233, 230, 234, 241, 280/210, 240, 259, 260, 261, 263, 270, 288.4, 304.3, 152.1, 152.3, 852; 180/223; 474/140, 146, 144, 145

[56] References Cited

U.S. PATENT DOCUMENTS

| | | | |
|---|---|---|---|
| 1,139,622 | 5/1915 | Yordi | 180/224 |
| 3,268,025 | 8/1966 | Fehn . | |
| 4,479,660 | 10/1984 | Pattison | 280/261 |
| 4,895,385 | 1/1990 | Becoat | 280/259 |
| 5,052,705 | 10/1991 | Ringle | 280/230 |
| 5,158,314 | 10/1992 | Farras Pinos | 280/260 |
| 5,184,838 | 2/1993 | Becoat | 280/260 |

FOREIGN PATENT DOCUMENTS

| | | | |
|---|---|---|---|
| 0709043 | 8/1931 | France | 180/223 |
| 2556305 | 6/1985 | France . | |
| 2574744 | 1/1990 | France . | |
| 2656847 | 7/1991 | France . | |
| 331905 | 11/1984 | Germany . | |
| 3431013 | 3/1986 | Germany | 280/304.3 |
| 3831890 | 2/1989 | Germany . | |
| 1450682 | 9/1916 | United Kingdom . | |
| 2138894 | 10/1984 | United Kingdom . | |

OTHER PUBLICATIONS

WO 91/12167, Aug. 22, 1991 (PCT) Biannic et al.

*Primary Examiner*—Karin L. Tyson
*Assistant Examiner*—Anne Marie Boehler
*Attorney, Agent, or Firm*—Collard & Roe

[57] ABSTRACT

A bicycle, in particular an all-terrain bicycle, with a front wheel which can be pivoted by means of a handlebar, a rear wheel, and a rear wheel drive assembly comprising a pedal unit, a transmission (19), and a gear element. The front wheel is driven by way a transmission interconnecting the rear wheel a cardan joint and another transmission interconnecting the cardan joint and the front wheel.

12 Claims, 7 Drawing Sheets

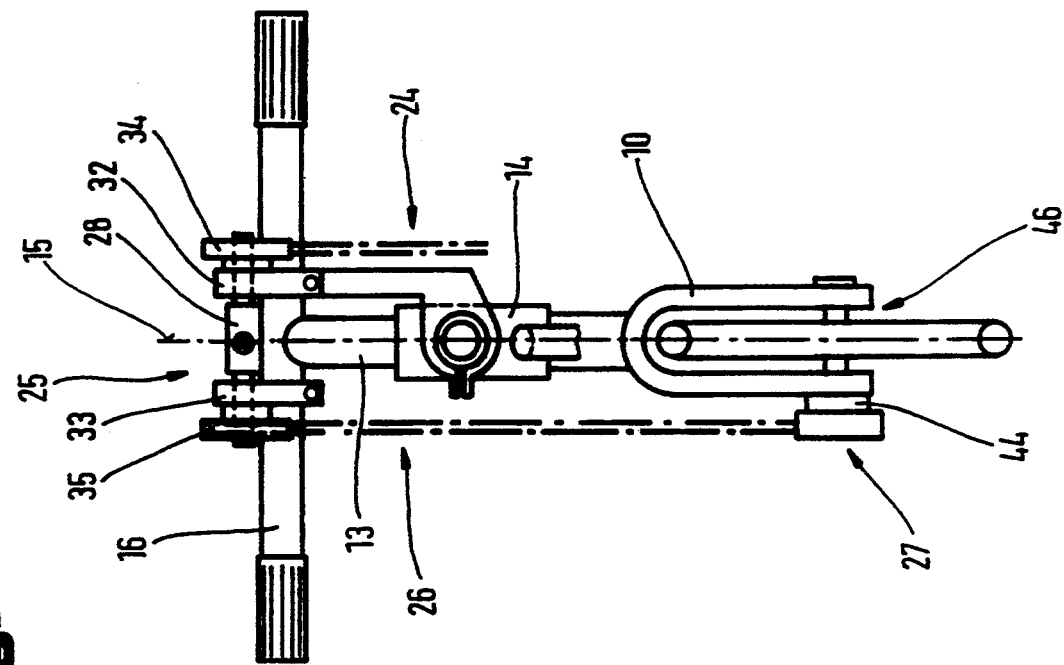
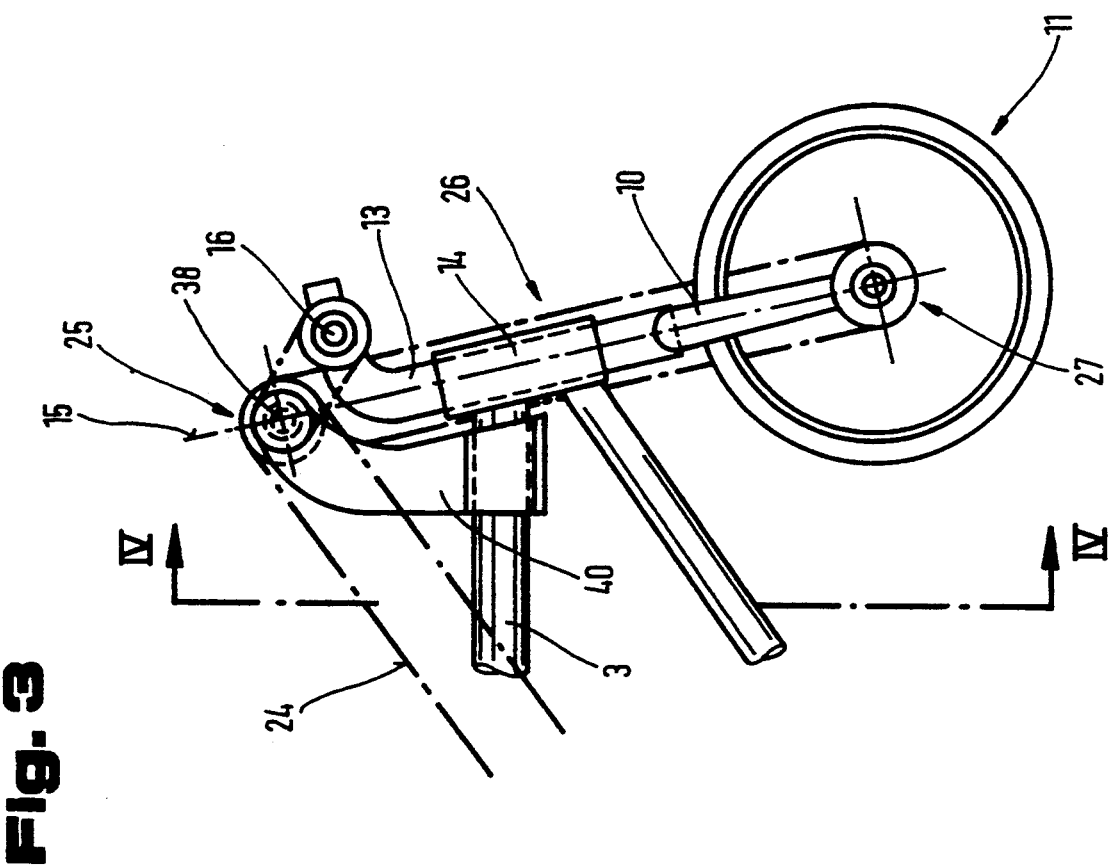

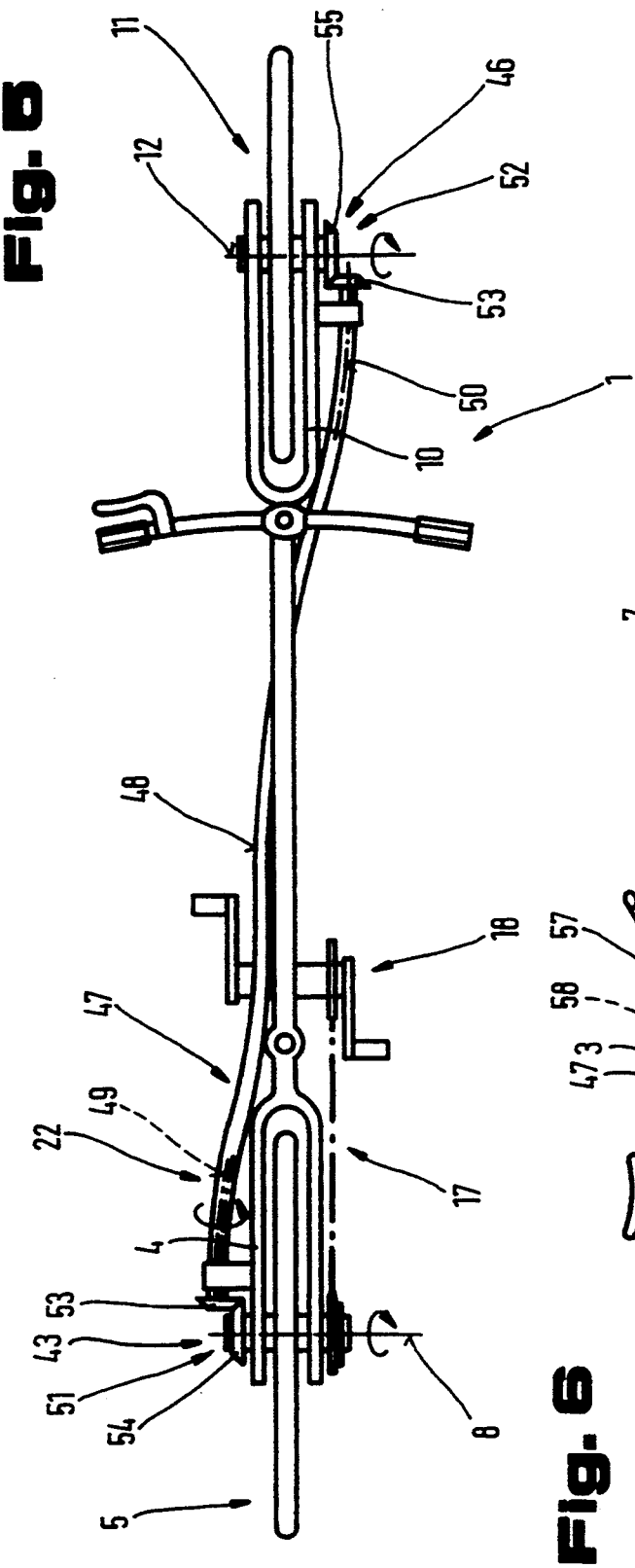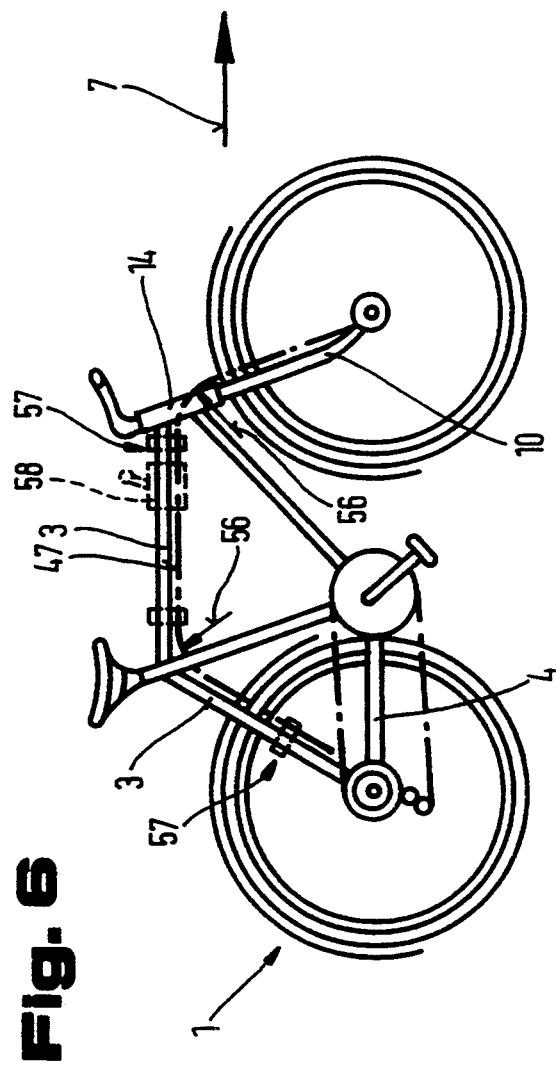

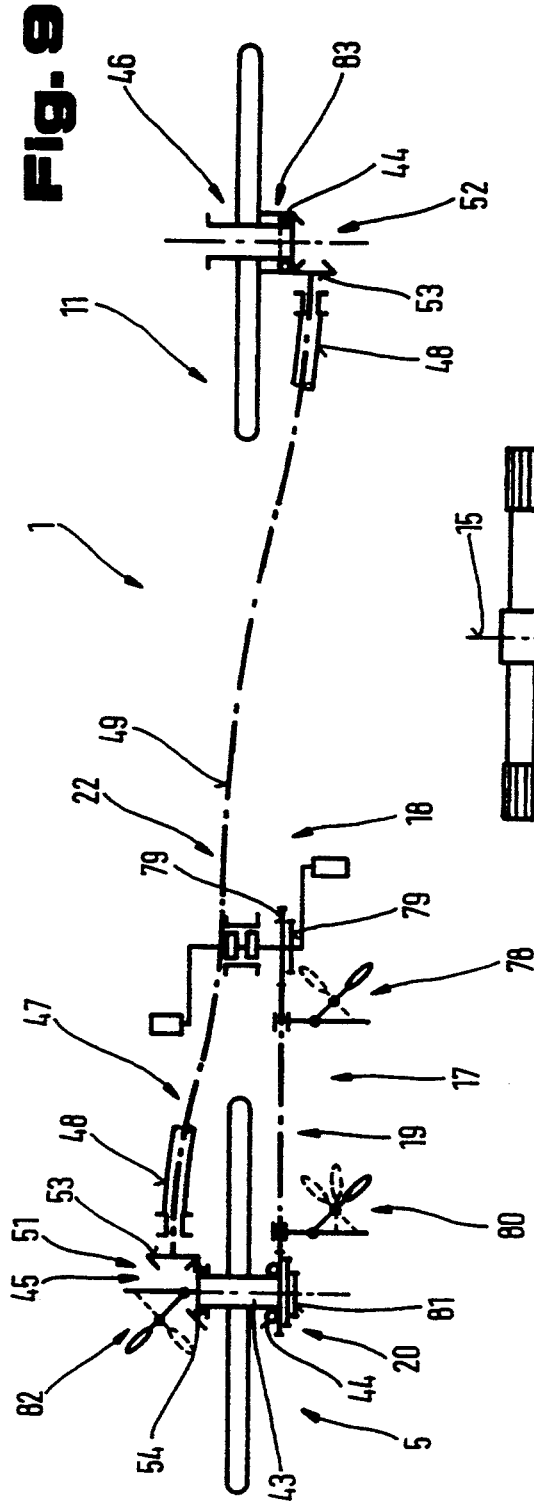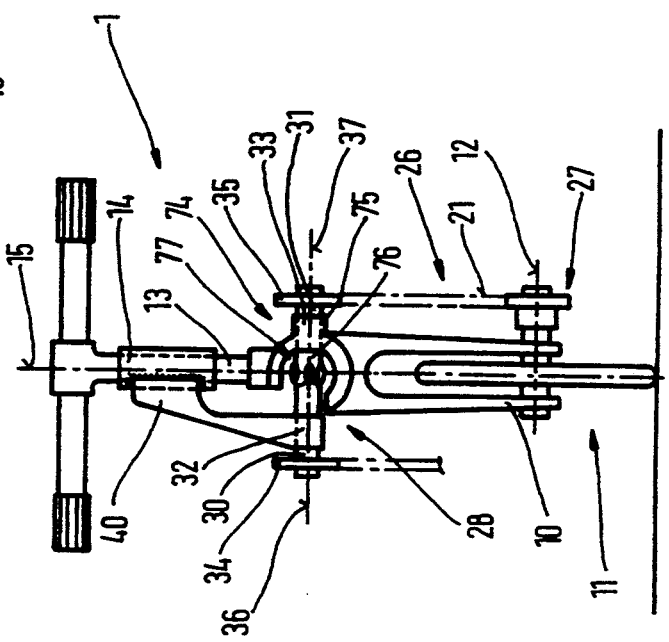

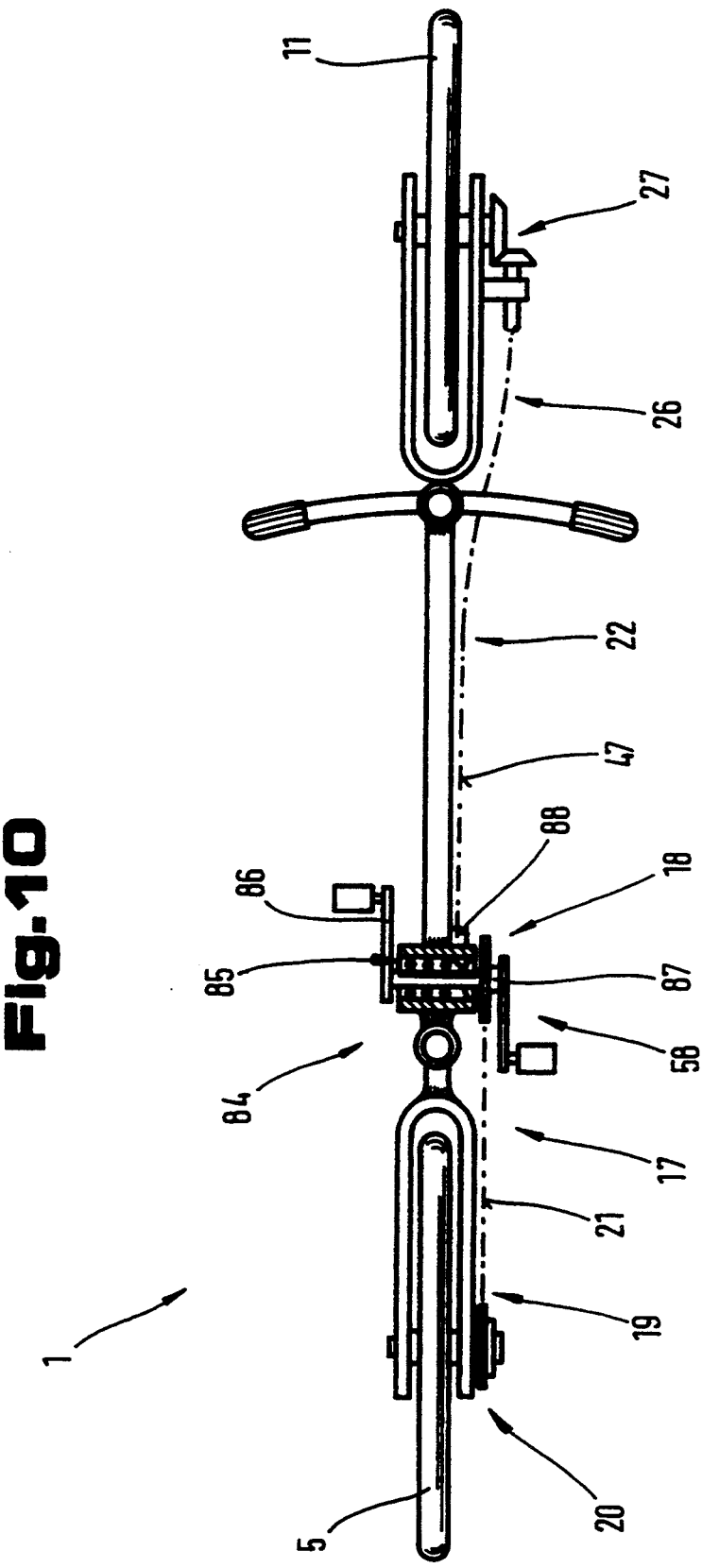

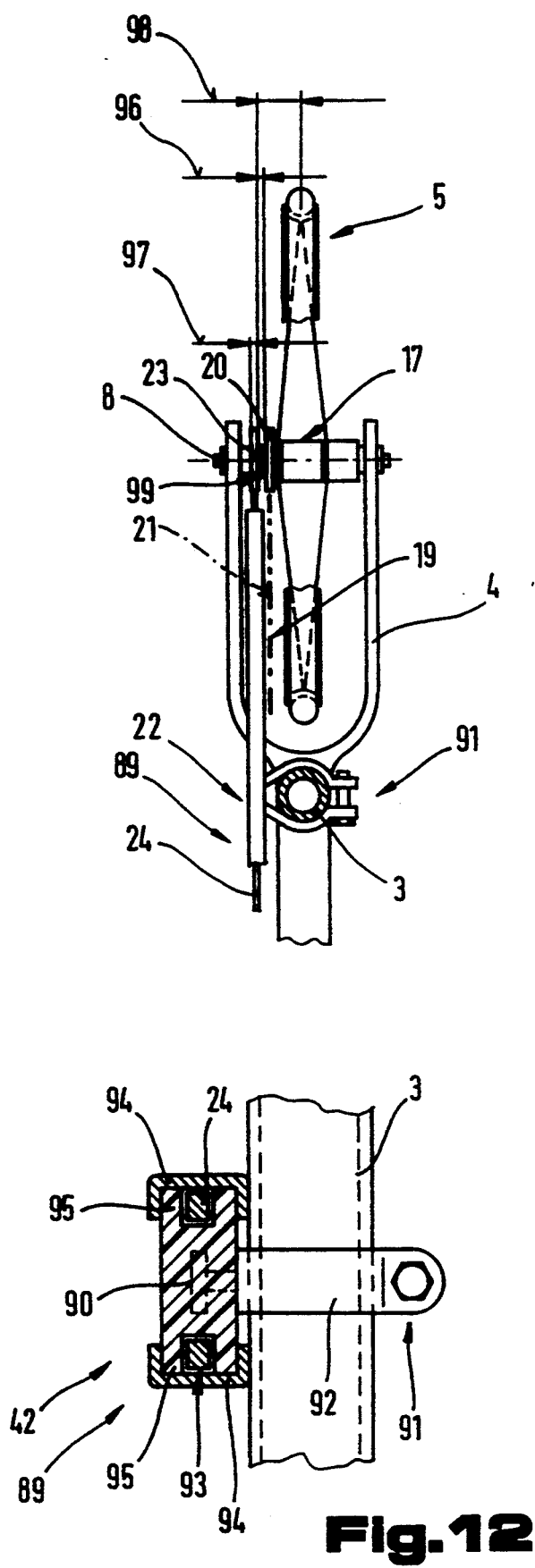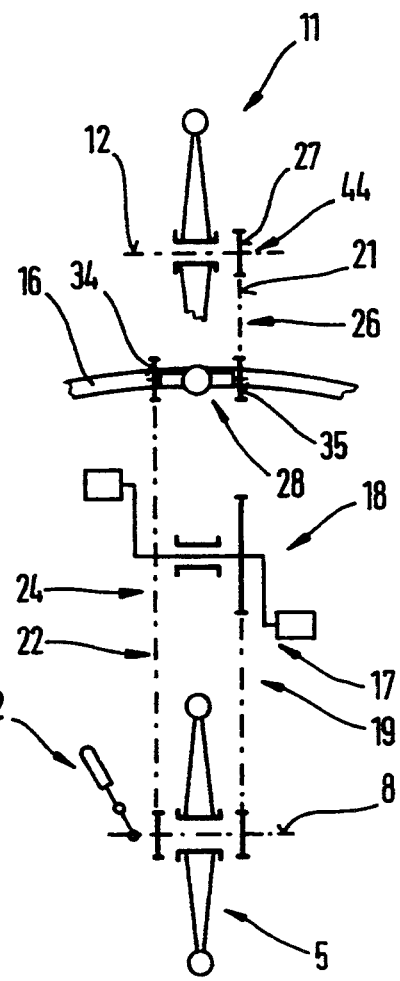
Fig. 11
Fig. 12
Fig. 13

BICYCLE, IN PARTICULAR AN ALL-TERRAIN BICYCLE

The invention relates to a bicycle, in particular an all-terrain bicycle, comprising frame, a front wheel, a rear wheel, a handle bar for steering the front wheel, a pedal unit, the front wheel, the rear wheel, the handle bar and the pedal unit being rotatably mounted on the frame, a transmission connecting the pedal unit to the rear wheel for transmitting a drive thereto, transmission means connecting the rear wheel to the front wheel for transmitting the drive to the front wheel.

Various bicycles are already known, in which in addition to the drive assembly for the rear wheel, a drive assembly is provided for the front wheel. A known all-wheel drive for the two wheels of a bicycle according to DE-OS 33 19 105 is provided with a multiple stage variable gear for the conversion of a driving Force, applied via a pedal lever or a motor with a reciprocating or revolving movement onto the wheel hub shafts of the wheels.

Furthermore, a force transmission—according to the DE-OS 38 31 890—is known, in which the rear wheel and if necessary the front wheel can be driven via a continuously adjustable force transmission through utilization of an oscillating swivel movement of a pedal lever.

Finally, drive arrangements with separate crank gears for the rear wheel and the front wheel of a bicycle are known, in which one crank gear is operated by the legs and the other by the hands. These known all-wheel drives are very costly, because they require many drive elements or gear elements for the transmission of the driving force onto the wheels.

It is an object of the present invention to create a bicycle, in particular an all-terrain bicycle, in which the rear wheel and the front wheel can be selectively driven together, and in which the drive arrangements require only a small number of drive elements.

This object of the invention is solved in a bicycle of the first-indicated type with a cardan joint comprising a driving shaft mounted on the frame for rotation about a central axis and a driven shaft mounted on the handle bar for rotation about a central axis, the driving shaft and driven shaft being universally movable in relation to each other from a position wherein the central axes thereof are in alignment with each other and the central axes extending parallel to the handlebar when in alignment. The transmission means comprises a transmission connecting the pedal unit to the rear wheel for transmitting a drive thereto, a transmission connecting the rear wheel to the driving shaft for transmitting the drive of the rear wheel to the driving shaft whereby a drive is imparted to the driving shaft, and a transmission connecting the driven shaft to the front wheel for transmitting the drive of the driving and driven shafts to the front wheel. The surprising advantage of this drive arrangement, connecting the drive elements of the rear wheel and of the front wheel, lies in the simultaneous drive of the front wheel in direct dependence on the rotational behaviour of the rear wheel, in which, independently of any translation changes through a switching device in the drive arrangement for the rear wheel, the force transmission takes place simultaneously onto the front wheel, in which through a high degree of efficiency a good utilization of the driving energy is achieved.

According to one feature of this invention, the handlebar is rotatable about a swivel axis and the driving shaft and driven shaft extend at respective sides of the swivel axis, the aligned central axes thereof extending perpendicularly to the swivel axis and the swivel axis intersecting the central axes at a common point of intersection. This effectively avoids impairment of the swivel movement of the front wheel on steering.

A further embodiment, wherein the transmissions connecting the rear wheel to the driving shaft and the driven shaft to the front wheel comprise roller chains, further comprises sprockets engaged by the roller chains and respectively affixed to the driving and driven shafts for rotation therewith. This is advantageous because thereby drive elements which have already proved successful in operation can be used for the drive of the front wheel, whereby cost-intensive special components are eliminated, and thereby the all-wheel drive can be produced economically. It is also advantageous to provide additional sprockets respectively affixed to the front and rear wheels, the additional sprockets being engaged by the roller chains, because thereby high moments of rotation, as occur in particular on all-terrain journeys, can be transferred without hindrance.

Another embodiment comprises a detachable coupling arrangement affixing the additional sprocket to the rear wheel hub, whereby the drive arrangement for the front wheel can be selectively disconnected, in order, for example, when using the bicycle on flat terrain or respectively on a secure base, to reduce the frictional losses which are higher with a greater number of drive elements.

If the front and/or rear wheel comprises a hub, a freewheeling arrangement may affix each of the additional sprockets respectively to the front and rear wheel, whereby the drive elements are coupled with the drive axes only when a propulsive output occurs and the drive arrangement is not also moved, e.g. when riding downhill.

It is also advantageous if a casing covers the transmission connecting the driving shaft to the rear wheel, whereby the rider of the bicycle can be protected from the moving drive means.

If the casing includes a guide element for the transmission, the guide element consisting of an abrasion-resistant material having a low friction coefficient, a guidance is achieved for the transmission means, which is free of wear and has minimal driving losses.

It is also advantageous if the bicycle further comprises attachment means for affixing the casing to the frame, whereby the mounting of the drive arrangement does not require any additional attachment elements and can be carried out very simply without special tools.

According to a further advantageous embodiment, the transmissions respectively connecting the front and rear wheels to the driven and driving shafts extend in parallel planes spaced a small distance apart from each other, whereby a very compact structural unit is achieved for the drive arrangement of the front wheel.

For a better understanding of the invention, the latter is explained in further detail with the aid of the embodiments illustrated in the drawings, in which:

FIG. 3 shows the drive device, according to the invention, for the front wheel with the transmission device according to FIG. 2 in side view;

FIG. 4 shows the drive device according to the invention in front view in section, according to lines IV—IV in FIG. 3;

FIG. 5 shows another variant embodiment of a bicycle with an all-wheel drive arrangement according to the invention, in plan view;

FIG. 6 shows the bicycle according to FIG. 5 in side view;

FIG. 8 shows a front view of a further embodiment of a drive arrangement according to the invention;

FIG. 9 shows a drive scheme for a bicycle according to the invention, with a drive arrangement for the rear and the front wheel;

FIG. 10 shows another variant of the drive arrangement;

FIG. 11 shows detail view of another embodiment of the drive arrangement in simplified, schematic representation;

FIG. 12 shows a guide arrangement according to the invention for the drive arrangement, partially in section;

FIG. 13 shows another embodiment of the drive arrangement according to the invention in schematic representation.

Figure 1:
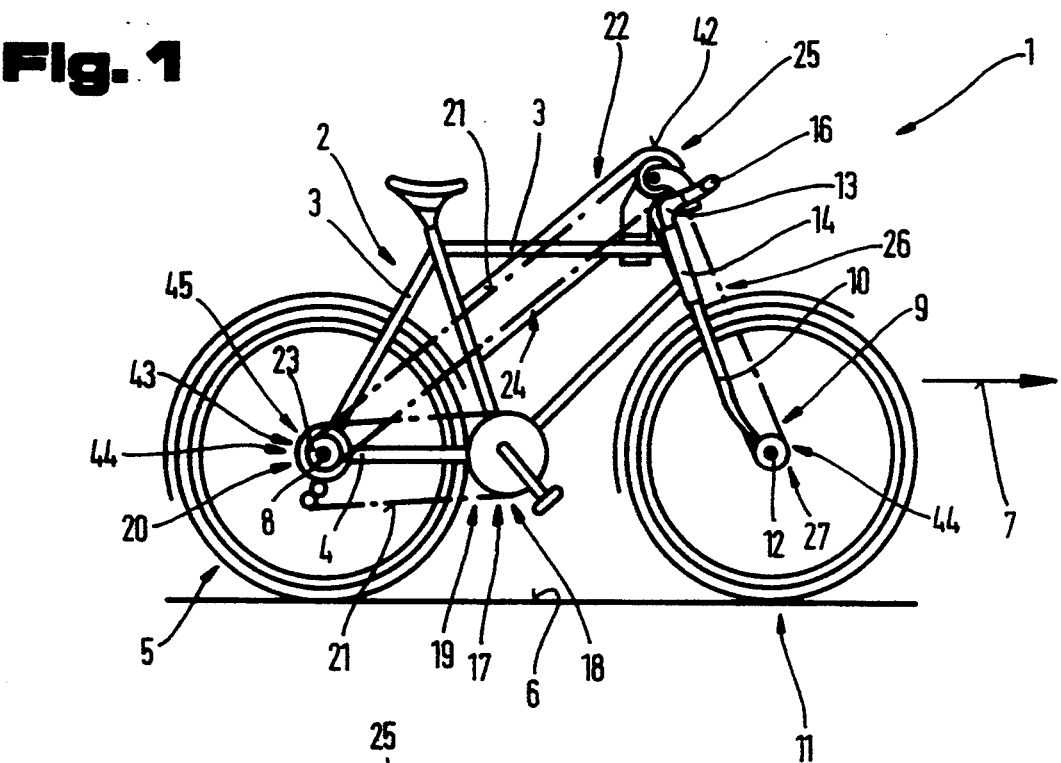
FIG. 1 shows a bicycle according to the invention, with an additional drive arrangement for the front wheel, in side view.

FIGS. 1 to 4 show bicycle 1 comprising frame 2, in particular of tubular frame parts 3,4, which are welded or soldered to each other at intersections. In mountings of the fork-shaped frame part 4, a rear wheel 5 is rotatably mounted about an axis 8 running horizontally to a standing surface 6 and perpendicularly in relation to a direction of travel—arrow 7.

In a mounting 9 of a fork-shaped frame part 10 a front wheel 11 is rotatably mounted about an axis 12 arranged parallel to the axis 8. The fork-shaped frame part 10 has in the direction opposed to the standing surface 6 a cylindrical extension 13, which is rotatably mounted in a tubular frame part 14, arranged approximately vertically, for rotating about a swivel axis 15. To carry out a swivel movement about the swivel axis 15, the extension 13 has a handlebar 16, which is fastened on the extension 13 approximately parallel to the standing surface 6.

The bicycle 1 has a known drive arrangement 17 for the rear wheel 5, which is formed by a pedal unit 18, Transmission 19 and drive elements 20. The Transmission 19 is formed in a preferred manner by a roller chain 21. The pedal unit 18 and the drive element 20 have sprockets engaging the roller chain. In addition, the drive arrangement 17 comprises a switch device to alter the ratio between the pedal unit 18 and the rear wheel 5. Such a switch arrangement, in which a translation-speed change is brought about by placing the roller chain 21 between different pairs of toothed wheels between the pedal unit 18 and the drive elements 20 of the rear wheel 5, is known for example as Shimao-switching type NEW, as used in bicycles, in particular mountain bikes of the firm KTM. A drive arrangement 22 is arranged between the rear wheel 5 and the front wheel 11, for the transmission of a rotational moment component of the rotational moment imparted to the rear wheel 5 via the drive arrangement 17. This comprises a drive element 23, which is affixed to the drive element 20 so as to rotate therewith, a transmission 24, e.g. a roller chain 21 and a transmission device 25, in particular in the region of the handlebar 16, which further transmits the rotational moment to the front wheel 11 via an—in particular endless—transmission 26, e.g. a roller chain 21 engaging a drive element 27 of the front wheel 11.

Figure 2:
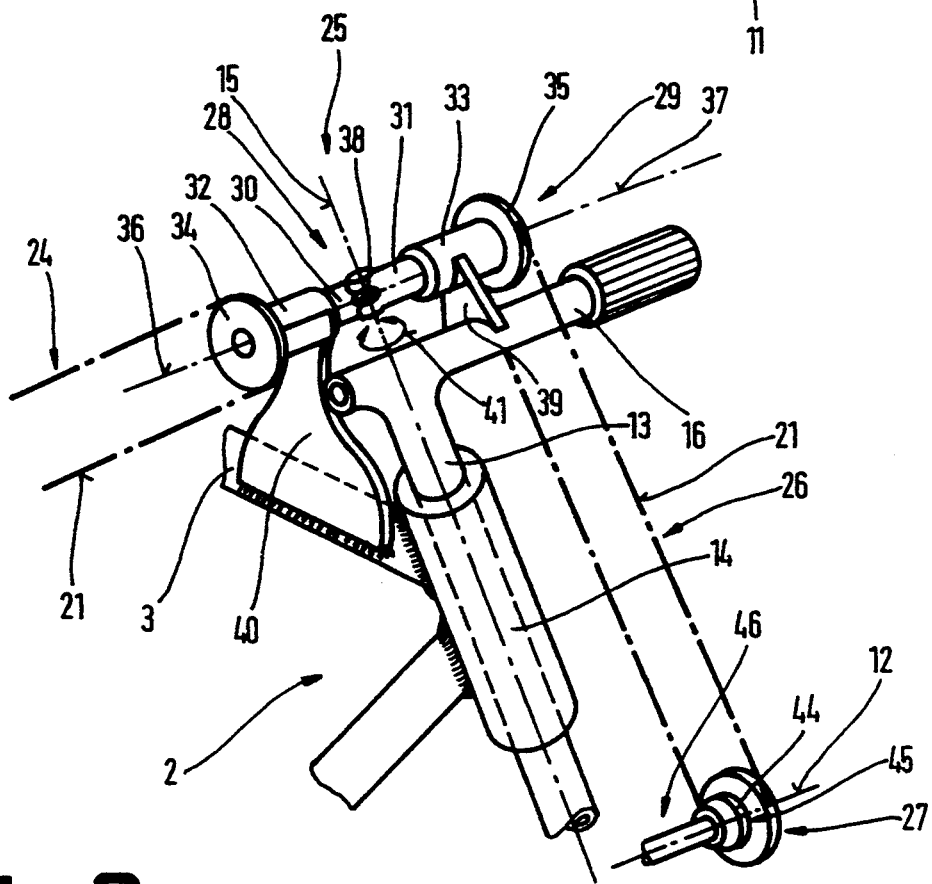
FIG. 2 shows a transmission device, according to the invention, of the drive device according to FIG. 1, in schematic, diagrammatic representation.

In FIGS. 2 to 4, the transmission device 25 and its arrangement in the region of the handlebar 16 and the swivel axis 15 is shown in greater detail. The transmission device 25 is formed by a coupling element 29, having a cardan joint 28, and coupling parts 30,31 rotatably mounted on bearing elements 32,33. On the coupling parts 30,31 there are arranged drive elements 34,35, affixed to the latter so as to rotate therewith, such as sprockets for the endless roller chains 21. Central axes 36,37 of the coupling parts 30,31 form a common point of intersection 38 with the swivel axis 15, the central axes 36,37 being arranged approximately at right angles to the swivel axis 15. The bearing element 33, bearing the coupling part 31, is attached via a spacer tongue 39 on the handlebar 16, whilst the further bearing element 32 is attached via a spacer tongue 40 to the frame part 3 of the frame 2. Through the arrangement of the cardan joint 28 between the coupling parts 30,31 and its position in relation to the swivel axis 15, the rotational moment can be transferred independently of a swivel movement according to a circular double arrow 41. Instead of the cardan joint 28 which is shown, multiple universally articulated coupling elements 29 may be used, in order to make possible even greater swivel movements of the front wheel 11 about the swivel axis 15. Of course, the transmission means 24,26 and the transmission device 25 can be arranged with the drive elements 34,35 inside casing elements 42, as illustrated FIG. 1, in particular of light plastics components.

The connection of the drive element 23 with a rear wheel hub 43 so as to be secure with respect t o rotation may take place via a known freewheeling arrangement 44 or a disconnectable coupling arrangement 45, whereby the drive arrangement 22 can be disconnected or connected as required. Of course, it is also possible to arrange the freewheeling arrangement 44 and/or the coupling arrangement 45 between the drive element 27 and a front wheel hub 46 of the front wheel 11.

In FIGS. 5 and 6, the bicycle 1 is shown with another variant of the drive arrangement 22. In this variant, a flexible shaft 47 is arranged as transmission means between the rear wheel hub 43 and the front wheel hub 46. The flexible shaft 47 has a fixed casing 48, in which an inner core 49 is rotatably mounted, which is formed in particular from a wire cable. The end regions of the casing 48 are attached to the frame parts 4,10 associated with the rear wheel 5 and the front wheel 11, in which a longitudinal central axis 50 of the shaft 47 forms approximately a right angle to the axes 8,12 of the rear wheel 5 and of the front wheel 11. The force-locking drive connection between the rear wheel 5 and the front wheel 11 with the inner core 49 is achieved by means of bevel gear arrangements 51,52 within each case a pinion 53 at the ends of the flexible shaft 47 and a drive wheel 54 on the rear wheel hub 43 and a drive wheel 55 on the front wheel hub 46. Thereby, the driving rotational moment applied via the pedal unit 18 and the drive arrangement 17 is distributed equally onto the rear wheel 5 and the front wheel 11. To achieve the same direction of rotation of the rear wheel 5 and of the front wheel 11, the bevel gear arrangements 51,52 are arranged on different sides of the rear or front wheel hub 43,46, in relation to the direction of travel—arrow 7. A special outline of the flexible shaft 47 to avoid small deflection radii 56 is shown along the frame parts 3,10,14. Thereby, it is also possible to attach the flexible shaft 47 by means of holding elements 57, e.g. clamps, on the frame parts 3,10,14, just as it is also possible to guide the flexible shaft 47 in partial regions inside the tubular frame parts 3,10.

The arrangement of a preferably switchable reversing gear 58, through which graduated rotational moments can be applied onto the rear or front wheel 5,11, is shown in dot-and-dash lines. This reversing gear 58 divides the flexible shaft 47 into two lines in each case between the rear wheel hub 43 and the reversing gear 58 and the latter and the front wheel hub 46. At the same time, the reversing gear 58 brings about a reversal of the direction of rotation between the two lines of the flexible shaft 47, whereby with the application of the reversing gear 58 the bevel gear arrangements 51,52 can be arranged on the same side of the rear wheel hub or front wheel hub 43,46.

Figure 7:
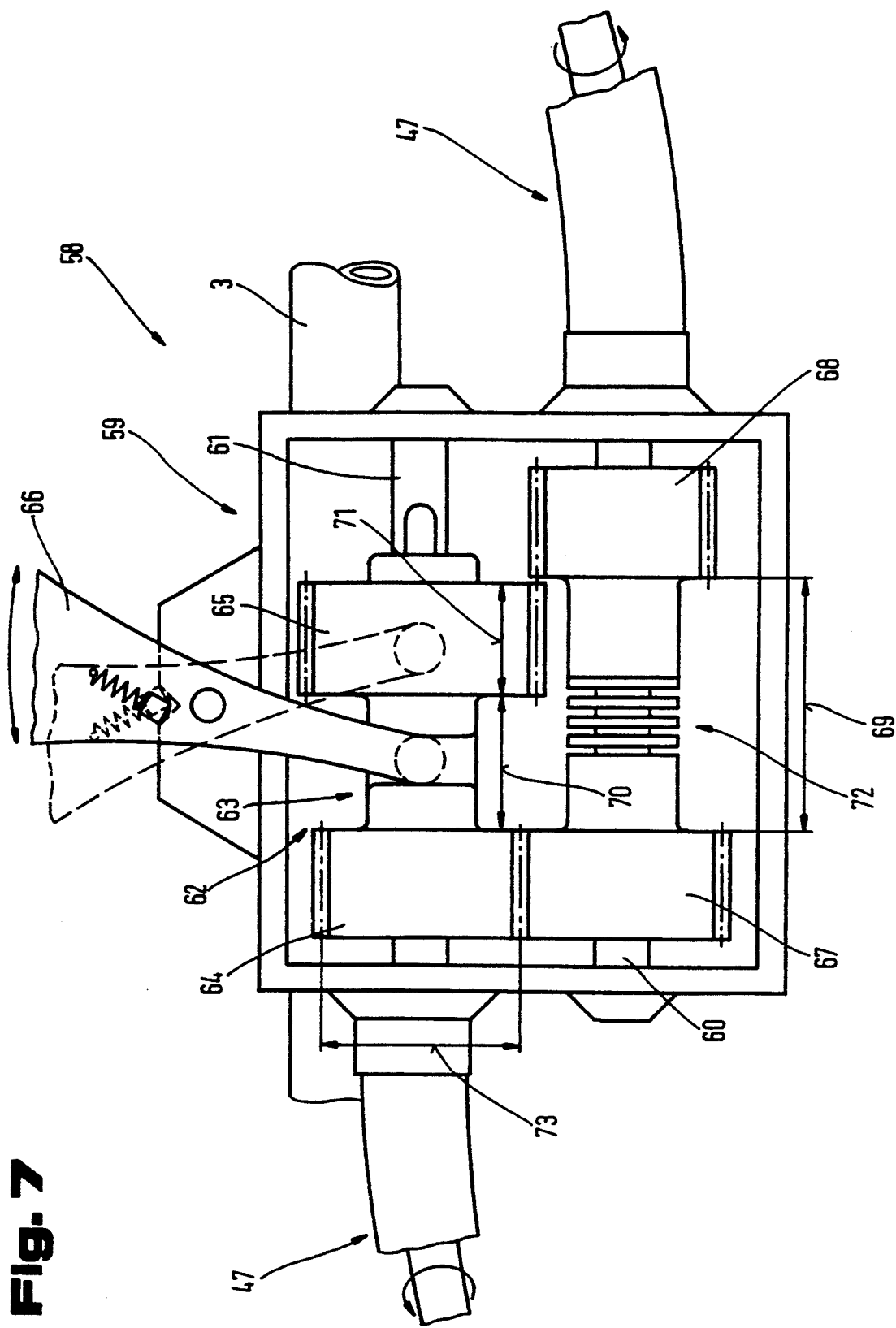
FIG. 7 shows a reversing gear for a drive arrangement according to the invention, in side view.

In FIG. 7 the reversing gear 58 is shown. In an approximately square housing 59, which is attached to the frame part 3 e.g. with a pipe clip, stub shafts 60,61 of two lines of the flexible shaft 47, running parallel to each other, are arranged so as to be rotatably mounted. On the stub shafts 61 a double toothed wheel 62, in one piece, is mounted so as to be secure with respect to rotation via a switching lever 66, engaging in a forked shape into an annular groove 63 between the toothed rings 64,65 of the double toothed wheel 62, so as to be longitudinally displaceable in longitudinal direction of the stub shaft 61. On the stub shaft 60 running in parallel, toothed rings 67,68 are arranged at a distance 69 from each other, which is greater than a distance 70 between the toothed wheels 64,65 plus a width 71 of the toothed ring 65, whereby on a longitudinal displacement of the double toothed wheel 62 in each case a toothed ring 64,65 can cooperate with a toothed ring 67,68. The toothed rings 67,68 are movable rotatably relative to each other via a friction coupling 72, in which one of the toothed rings 67,68 is connected with the stub shaft 60 so as to be secure with respect to rotation.

Through graduation from the nominal diameter 73 of the toothed rings 64,65,67,68, in a known manner an at least two-stage translation change can be undertaken in a fixed ratio, in which it is expedient to arrange at least one translation ratio through selection of the same nominal diameter 73 of the toothed rings 64,67 or 65,68, to be brought into engagement, for the translation ratio 1:1. Thereby also the driving rotational moment is also effective in equal parts on the rear wheel 5 and the front wheel 11. A translation ratio deviating therefrom is then expedient, when the driving rotational moment is to be distributed unequally, e.g. when riding inclines where the load on the rear wheel is greater, and therefore a higher driving moment can become effective. The equalization of the rotation rates between the rear wheel 5 and the front wheel 11 takes place in this case through the relative mobility of the toothed rings 67,68 with respect to each other, which is possible via the friction coupling 72.

A ratio deviating from the translation ratio 1:1, which can be set in a changeable manner, is advantageous in particular when owing to particular conditions of use wheels of different size come to be used on the bicycle 1. Thus, in different disciplines of cycling sport it is usual to use a front wheel 11, which has a smaller diameter than the rear wheel 5. In such a case, in the reversing gear 58 in the selection of the corresponding translation ratios, the different rotation rate of the rear wheel 5 and the front wheel 11 is balanced out.

For a reliable operation of a bicycle on an uneven terrain and on unpaved paths, through an additional drive of the front wheel a correspondingly higher operating reliability is achieved. Devices such as, e.g. freewheeling devices here can interrupt a driving line, e.g. to the front wheel, dependent on use, such that the transmission means are put at a standstill, when no propulsive force is to be applied, such as, for example, on riding over inclines. Instead of the reversing gear 58, operating on a mechanical principle, the friction coupling 72, of course a rotation moment converter, based on the hydraulic principle, can also be used for the continuous selection of a translation ratio, and also the arrangement of a so-called viscose coupling to determine the rotation rate with a different translation ratio for the rear wheel or the front wheel. In FIG. 8 a further embodiment of a drive arrangement is shown for the front wheel 11 of a bicycle 1. The fork-shaped frame part 10, supporting the front wheel 11, has a C-shaped transition part 74 in the direction of the extension 13, mounted in the frame part 14 so as to be orientable about the swivel axis 15. Parallel to the axis 12 of the front wheel 11, in a lug 75 of the C-shaped transition part 74, the bearing element 33 for the coupling part 31 of the cardan joint 28 is arranged. The drive element 35 is attached on a stub shaft 76 of the coupling part 31. On the fixed frame part 14, via the spacer tongue 40, the further bearing element 32 for the coupling part 30 and the drive element 34 attached thereon, are arranged. In the unswivelled position of the front wheel 11 about the swivel axis 15 and in relation to a longitudinal axis of the bicycle 1, the central axes 36,37 of the coupling parts 30,31 are arranged in alignment with each other. In a free space 77 formed by the C-shaped transition part 74, the cardan joint 28 connecting the coupling parts 30,31 is arranged, in the mid point of which the swivel axis 15 and the central axes 36,37 intersect. Thereby, the transmission takes place of the driving rotational moment via the drive element 34, attached non-orientably to the frame part 14, and via the cardan joint 28, to the drive element 35, which is orientable about the swivel axis 15, and via the transmission 26, e.g. the roller chain 21, to the drive element 27 of the front wheel 11. The arrangement of the cardan joint 28 therefore makes possible the transmission of the driving rotational moment between the two drive elements 34,35 which are orientable relative to each other.

In FIG. 9 a drive scheme for the drive arrangement of the bicycle 1 is shown, with the drive arrangement 22 for the front wheel 11, in which, to clearly show the drive elements the frame parts of the bicycle 1 were omitted. The drive arrangement 17 for the rear wheel 5 comprises the pedal unit 18, the transmission means 19, the drive elements 20 and a switching arrangement 78 in the region of the pedal unit 18, to place the transmission means 19 onto chain wheels 79 having different diameters. A further switching arrangement 80 is arranged to place the transmission means 19 on chain wheels 81, having different diameters, for the rear wheel 5. Via the coupling device 45, e.g. a switchable claw coupling 82, friction coupling or the like, the conical output wheel 54 of the bevel gear arrangement 51 is able to be brought in and out of engagement with the rear wheel hub 43. Between the bevel gear arrangement 51 and the further bevel gear arrangement 52, cooperating with the front wheel hub 47 so as to be secure with respect to moment of rotation, the flexible shaft 47 is arranged on the bicycle 1 so as to be secure with respect to rotation, with the covering 48, and supports, movable rotatably, the inner core 49 with the pinions 53, which are connected with the inner core 49 so as to be secure with respect to rotation. In order to make possible, for example, a riding downhill without blocking the drive arrangement 22 or the flexible shaft 47 in the rolling state of the bicycle 1, i.e. without the application of a driving rotational moment, there are arranged between the drive element 20 and the rear wheel hub 43 and the bevel gear arrangement 51 and the front wheel hub 46 known free wheeling arrangements 44, such as, for example, roller elements 83 or the like, transferring rotational force only in one direction.

In FIG. 10 a drive scheme is shown for the drive arrangement of the bicycle 1 with the drive arrangement 17 for the rear wheel 5 and the drive arrangement 22 for the front wheel 11. Here, the pedal unit 18 and the reversing gear 58 form a drive arrangement 84 in which a switching arrangement 85 is arranged for different translation ratios between a drive axis 87, connected with pedal units 86, and a drive shaft 88. The switching arrangement 85 is based here on the principle of the known hub inner switching. From the drive arrangement 84, the driving rotational moment, applied via the pedal unit 18, is passed via the drive arrangement 17 to the drive element 20 of the rear wheel 5 and the drive arrangement 22 to the drive element 27 of the front wheel 11, in which the transmission means 19,26 may be formed by roller chains 21 or flexible shafts 47, in which preferably the transmission means 26 associated with the front wheel 11 is formed by the flexible shaft 47.

In FIGS. 11 and 12 a further embodiment of the drive arrangement 22 is shown. In this arrangement, a guide arrangement 89, consisting of an I-section 90, is attached to the frame part 3 of the bicycle 1 via attachment elements 91, e.g. pipe clamps 92. In recesses 93 of the I-section 90, the transmission 24, e.g. a roller chain 21, is guided. The I-section 90 consists for example of an abrasion-resistant material such as metal, plastics, fibre-reinforced plastics etc., which at the same time has a low friction coefficient, whereby a high wear-resistance is produced, and also low frictional losses occur. The recesses 93, acting as longitudinal guide for the transmission 24 are covered for example by U-sections 94, which are detachably secured to cross-pieces 95 of the I-section 90, e.g. are screwed thereto, whereby these form an effective contact protection for the rider of the bicycle 1.

The drive arrangement 17 for the rear wheel 5 with the transmission 19, e.g. the roller chain 21 and the drive arrangement 22 with the transmission 24 are arranged in parallel planes spaced apart a distance 96 which corresponds approximately to a width 97 of the drive element 20 or 23. It is expedient here if the drive arrangement 22 has a greater distance 98 from the rear wheel 5 than the drive arrangement 17, whereby a subsequent equipping of the bicycle 1 with the drive arrangement 22 is facilitated. It is additionally advantageous if the drive element 23 is mounted via a freewheeling arrangement 99 on the axis 8 of the rear wheel 5. This freewheeling arrangement 99, known per se, ensures the transmission of a drive moment only in a rotational direction of the drive element 23 and enables the drive arrangement 22 to be stopped when riding downhill, i.e. that in such an operating state this, and hence the transmission 24, is at a standstill, whereby transmission losses through friction and increased wear are avoided.

In FIG. 13, a drive scheme is shown of a further embodiment of the drive arrangement 22 for the front wheel 11. Via the drive arrangement 17, the force applied onto the pedal unit 18 is transferred to the rear wheel 5. On the side of the rear wheel 5, opposed to the drive arrangement 17, the drive arrangement 22 for the front wheel 11 is arranged, and via the claw coupling 82 is able to be coupled in a force-locking manner with the rear wheel 5. The transmission 24 of the drive arrangement 22 forms here the force transmission to the cardan joint 28, which is arranged in the region of the handle bar 16. Via the cardan joint 28, the flux of force then takes place onto the side of the front wheel 11, opposed to the drive arrangement 22, and via the transmission 26 onto the front wheel 11. Through the arrangement of the claw coupling 82, the drive arrangement 22 can now be switched on or off selectively by the rider for the force-locking connection between the rear wheel 5 and the front wheel 11. Of course it is also, moreover, possible to equip the drive element 27, which is connected so as to be rotationally movable with the front wheel 11, with a known freewheeling arrangement 44.

For a better understanding of the invention, individual parts were illustrated distorted on an unproportional scale In addition, individual combinations of features described as a whole in the illustrated embodiments may form independent solutions in accordance with the invention.

LIST OF REFERENCE NUMBERS 1 bicycle
2 frame
3 frame part
4 frame part
5 rear wheel
6 standing surface
7 arrow
8 axis
9 mounting
10 frame part
11 front wheel
12 axis
13 extension
14 frame part
15 swivel axis
16 handlebar
17 drive arrangement
18 pedal unit
19 transmission means
20 drive element
21 roller chain
22 drive arrangement
23 drive element
24 transmission means
25 transmission device
26 transmission means
27 drive element
28 cardan joint
29 coupling element
30 coupling part
31 coupling part
32 bearing element
33 bearing element 34 drive element
35 drive element
36 central axis
37 central axis
38 point of intersection
39 spacer tongue
40 spacer tongue
41 double arrow
42 covering element
43 rear wheel hub
44 freewheeling arrangement
45 coupling arrangement
46 front wheel hub
47 shaft
48 casing
49 inner core
50 longitudinal central axis
51 bevel gear arrangement
52 bevel gear arrangement
53 pinion
54 drive wheel
55 drive wheel
56 deflection radius
57 holding element
58 reversing gear
59 housing
60 stub shaft
61 stub shaft
62 double toothed wheel
63 groove
64 toothed ring
65 toothed ring
66 switching lever
67 toothed ring
68 toothed ring
69 distance
70 distance
71 width
72 friction coupling
73 nominal diameter
74 transition region
75 projection
76 stub shaft
77 free space
78 switching arrangement
79 chain wheel
80 switching arrangement
81 chain wheel
82 claw coupling
83 roller element
84 drive arrangement
85 switching arrangement
86 pedal unit
87 drive axis
88 drive shaft

I claim:
1. A bicycle comprising
(a) a frame,
(b) a front wheel,
(c) a rear wheel,
(d) a handle bar for steering the front wheel,
(e) a pedal unit,
   (1) the front wheel, the rear wheel, the handle bar and the pedal unit being rotatably mounted on the frame,
(f) a cardan joint comprising
   (1) a driving shaft mounted on the frame for rotation about a central axis and
   (2) a driven shaft mounted on the handle bar for rotation about a central axis,
   (3) the driving shaft and driven shaft being universally movable in relation to each other from a position wherein the central axes thereof are in alignment with each other and the central axes extending parallel to the handlebar when in alignment,
(g) a transmission connecting the pedal unit to the rear wheel for transmitting a drive thereto,
(h) a transmission connecting the rear wheel to the driving shaft for transmitting the drive of the rear wheel to the driving shaft whereby a drive is imparted to the driving shaft, and
(i) a transmission connecting the driven shaft to the front wheel for transmitting the drive of the driving and driven shafts to the front wheel.

2. The bicycle of claim 1, wherein the handlebar is rotatable about a swivel axis and the driving shaft and driven shaft extend at respective sides of the swivel axis, the aligned central axes thereof extending perpendicularly to the swivel axis and the swivel axis intersecting the central axes at a common point of intersection.

3. The bicycle of claim 1, further comprising a bearing element affixed to the handle bar, the driven shaft being rotatably mounted in the bearing element, and another bearing element affixed to the frame, the driving shaft being rotatably mounted in the other bearing element.

4. The bicycle of claim 1 wherein the transmissions connecting the rear wheel to the driving shaft and the driven shaft to the front wheel comprise roller chains, further comprising sprockets engaged by the roller chains and respectively affixed to the driving and driven shafts for rotation therewith.

5. The bicycle of claim 4, further comprising additional sprockets respectively affixed to the front and rear wheels, the additional sprockets being engaged by the roller chains.

6. The bicycle of claim 5, wherein the rear wheel comprises a hub and the additional sprocket affixed to the rear wheel being affixed to the rear wheel hub for rotation therewith.

7. The bicycle of claim 6, further comprising a detachable coupling arrangement affixing the additional sprocket to the rear wheel hub.

8. The bicycle of claim 6, wherein the front wheel comprises a hub, further comprising a freewheeling arrangement affixing each of the additional sprockets respectively to the front and rear wheel.

9. The bicycle of claim 1, further comprising a casing covering the transmission connecting the driving shaft to the rear wheel.

10. The bicycle of claim 9, wherein the casing includes a guide element for the transmission, the guide element consisting of an abrasion-resistant material having a low friction coefficient.

11. The bicycle of claim 9, further comprising attachment means for affixing the casing to the frame.

12. The bicycle of claim 1, wherein the transmissions respectively connecting the front and rear wheels to the driven and driving shafts extend in parallel planes spaced a small distance apart from each other.

* * * * *